(No Model.)
E. A. SPERRY.
ELECTRIC BRAKE.
No. 534,977.    Patented Feb. 26, 1895.
Fig. 1.
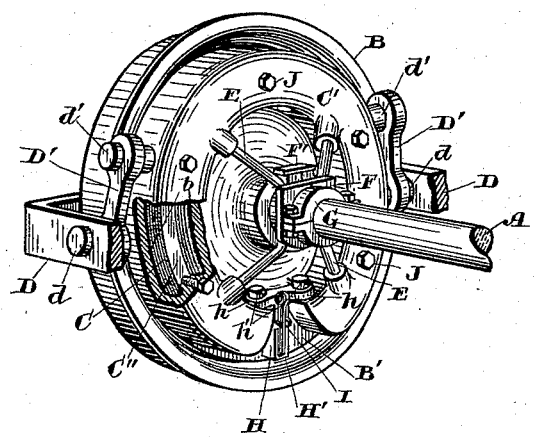
Fig. 2.    Fig. 3.
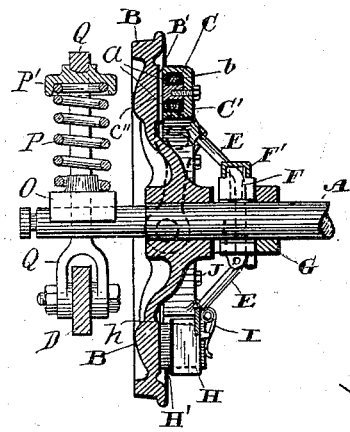    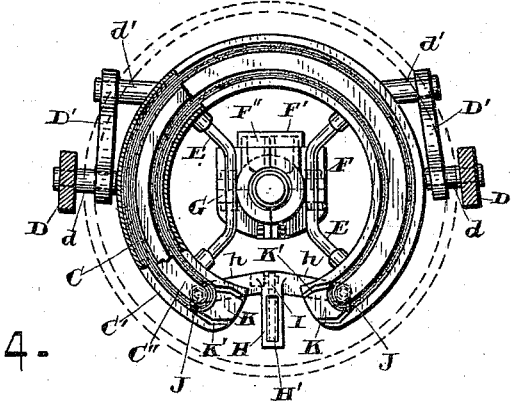
Fig. 4.
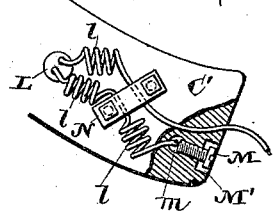
Witnesses.    Inventor.

UNITED STATES PATENT OFFICE.

ELMER A. SPERRY, OF CLEVELAND, OHIO, ASSIGNOR TO THE SPERRY ELECTRIC RAILWAY COMPANY, OF OHIO.

ELECTRIC BRAKE.

SPECIFICATION forming part of Letters Patent No. 534,977, dated February 26, 1895.

Application filed June 8, 1894. Serial No. 513,920. (No model.)

*To all whom it may concern:*

Be it known that I, ELMER A. SPERRY, a citizen of the United States, residing at Cleveland, in the county of Cuyahoga and State of Ohio, have invented certain new and useful Improvements in Electric Brakes, of which the following is a specification.

My invention relates to electric brakes for retarding or arresting motion, and more particularly to magnetic brakes wherein the electric current is used for energizing the magnet; and consists in certain details of construction; means of support; guiding; lubrication; bringing up the electrical terminals, and other structural details which contribute to the cheapness and efficiency of the construction of electric brakes. These are fully described and illustrated in the following specification and the accompanying drawings, the novel features thereof being pointed out in the claims annexed to the said specification.

In the drawings, Figure 1 represents an isometrical view, partially in section; Fig. 2, a sectional view; Fig. 3, an elevation, shown as being partly broken away; Fig. 4, a detail of my improved brake mechanism.

Like letters of reference indicate similar parts throughout all the views.

The invention will be understood to be equally well adapted for retarding oscillatory, vibratory or rectilinear motions as well as for arresting continuous rotary motion. Where employed to arrest rotary motion the brake application should be made as far from the center of rotation as is practicable. If a wheel-shaped magnet is used mounted upon an axle, as for instance between the wheels upon the car axle A, the removal of a wheel would be required before the brake magnet can be applied. I have found however that by making the brake magnet in a crescent shape I am enabled to easily attach or remove it from the vehicle without disturbing any of the wheels, and provide space for relief of magnetic stress where the lines are withdrawn and do not flow through the masses immediately under or adjacent to the braking face. This constant protrusion and withdrawal of lines causes the production of powerful eddy currents in the masses discussed in a former application, Serial No. 498,511, filed January 30, 1894, and which is a function of great value in the power and operation of the brake. The gap between the magnet ends also affords a space opposite the braking face in which a proper lubricator for the said face can be applied. This lubrication is found to reduce very materially the wear upon the surface, bringing it down in practice so that no appreciable wear can be discerned, and the surfaces become highly polished. It is always found better to support the mass of the brake magnet, when for instance used upon cars, upon the elastically suspended truck parts than to have it directly axle-mounted, the truck springs forming a yielding medium for the magnet. This, however, precludes direct attachment to the axle in any way, and necessitates freedom of movement between the brake and the rotating part.

It will readily be understood that the rotating part may be a part of the wheel itself, or an extra piece suitably attached to either wheel or axle.

Allowing B to indicate a car wheel, a face B' is provided for the co-operation of the brake magnet C' supported from the truck frame, or any suitable portion thereof, as D, by the links D' and pins $d\ d'$. It will be noticed, especially in Figs. 1 and 2, that the pins $d\ d'$ are out of a vertical line in such a way that gravity acts to constantly withdraw the brake from the wheel and hold it over against any suitable abutment as collar G, forming a guide between which and the brake magnet or projections therefrom is inserted a separable wearing face F, provided with a cap F' joining the two and at the same time covering an oil cavity F'' in each. It will be seen that this guide holds the magnet laterally but allows it freedom of movement vertically with reference to the axle A. This takes place especially when the truck frame is resiliently mounted upon the axle A, the magnet being supported upon and moving with the truck frame. A coil C laps back upon itself and winds around a removable core C'' which is suitably secured to the main body of the brake magnet C' as by bolt shown at J.

The joint between the core C'' and the body C' may be machined, the slot in this case being originally carried out to the gap at both ends, and afterward stopped by the removable portions K, see Fig. 3, which may be held in position in any suitable manner.

The coil C is smaller than the annular groove in which it lies, and in the space is placed insulation as for instance by pouring, in a molten liquid or plastic state, an insulating substance such as sulphur, Portland cement, plaster of paris or a like dense, resisting substance or a mixture of them, up for instance to a point in the groove covering the coil. Afterward lead, Babbitt, or like metal may be poured in the face slot, sufficient to make a solid face of the whole, smooth and practically uninterrupted after being machined. This is important as leaving no irregularities for the lodgment of sand, gritty substances or dirt. This metal at the same time holds the block K in place by the peculiarity of the contour of the groove between it and the body of the brake magnet C'. The inner faces of the groove are preferably dove-tailed as shown in section Fig. 2, so as to more readily hold the filling in place. The gap in the crescent is wide enough to admit of the largest axle to be used, and the lubricator therein may be either solid or fluid, and is shown in the form of a graphitic block H', graphite-carbon brush or the like, contained in the cavity of the receptacle H and forced forward by the pressure of the spring I, which spring may be said to feed the lubricator.

In the details of bringing out the terminals shown in Fig. 4, a clamp secures the terminals after they have issued from the coil through the insulating bushing L. One of them is frequently "grounded" on the magnet frame by the screw M, the end or head of which is under the surface of the counterbore M' securing the wire in the hole m.

Attention is called to the free wire of considerable length which is in the coil l l, &c., each side of the clamp. Other details of the support of this wire might be used, but the free wire and the bringing out of the ground terminal and re-embedding it into the material is found of value for the purpose of testing the coil when desirable. An extra or free wire is found valuable to prevent crystallization, and also when for any reason the terminals are disturbed through accident or otherwise the free wire necessary for re-attachment is found of service.

It will be understood that any means of support of the brake magnet, may be employed without departing from the spirit of the invention. The one shown affords attachment at a point above the center of gravity in one plane, and practically in the center of the mass or the center of gravity in the other plane, or the plane of the magnet.

It will be seen that the truck frame, which may be indicated by the frame D, is yieldingly mounted or supported upon the axle A by means of links Q, which pass upward and rest upon the top of the spring cap P'. The spring P under this cap rests upon the journal brass O, which in turn rests upon the axle journal as shown in Fig. 2.

The use and operation will be readily understood from the foregoing.

The brake coil or coils may be supplied by current from any of the usual sources, as for instance the current generated by the motor after being transformed into a generator, from the central station, storage battery, primary battery, or any of the usual sources of electrical potential. Practically the whole of the mass of the brake is energized by the coil, the coil being of crescent shape after it is folded back upon itself. The mass could be energized by a single coil, the return of which could be laid upon the back of the magnet, but in this event less of the turns would be effective. The coil could also be continued to cross the gap and enter the mass at the other side, but in this case the magnet would not be easy of attachment and removal, and in either event it would be fully energized and operated substantially as herein described.

It will readily be understood that the brakes, especially when applied to car service, and more particularly while in action, must of necessity receive much of the concussion, pounding and vibration of the car axle. It has been found that the energizing coil will not withstand this unless a special dense support is provided for it in which it is embedded, which support should be of such a character as can be brought in full contact with the coil on nearly every side even after the brake magnet has attained a considerable degree of heat. To accomplish this, I have used with success the sulphur or like material above specified.

Although it is designed to use all of the above features in connection with one another, yet it is obvious that some may be used without the others, and the invention extends to such use.

It will be readily understood that the gap in the crescent is in the line of motion which line is taken as being circumferential, the motion being a rotary motion.

I claim—

1. In a brake for revolving machinery, a revolving part, a brake magnet, independent means for the entire support of the brake magnet in combination with means mounted upon the revolving part cooperating with the face opposite the working face of the magnet for guiding the magnet.

2. In a brake for revolving machinery, a revolving part, a brake magnet, independent means for the entire support of the brake magnet, and means mounted upon the revolving part cooperating with a face opposite the working face of the magnet for guiding the magnet in one plane, leaving the same free in another.

3. In a brake for revolving machinery a revolving part, a brake magnet, independent means for the entire support of the brake magnet, and means mounted upon the revolving part cooperating with a face opposite the working face of the magnet for guiding the magnet horizontally, and leaving the same free vertically.

4. In a brake for revolving machinery, a revolving axle, a brake magnet encircling such axle with its aperture larger than the axle, in combination with means independent of the axle so encircled for the entire support of the brake magnet consisting in part of a yielding medium, and means for guiding the magnet with reference to said revolving part.

5. In a brake for arresting motion, a brake magnet of circular form presenting a lateral wearing face, supports for the magnet attached one on either side of the center of the circle of said magnet and above the center of gravity of the mass as a whole, substantially for the purpose specified.

6. In a brake for revolving machinery, a revolving part, a brake magnet presenting a wearing face upon one side, means for the support of the brake magnet independent of the revolving element, and abutments from the other side of the magnet approaching the revolving part.

7. In a brake for revolving machinery, a revolving part, a brake magnet presenting a wearing face upon one side, means for the support of the brake magnet independent of the revolving element, abutments from the other side of the magnet approaching the revolving part, means mounted upon the revolving part for guiding the magnet, and a wearing plate or portion between the guide and the abutments.

8. In a brake for revolving machinery, a revolving part, an independently supported brake magnet, means mounted upon the revolving part for guiding the magnet, and a separable wearing plate or portion between the guide and the magnet.

9. In a brake for revolving machinery, a revolving part, an independently supported brake magnet, means mounted upon the revolving part for guiding the magnet, and a separable wearing plate or portion between the guide and the magnet consisting of two parts, and a lubricant-containing cavity in one or more of such parts.

10. In a brake for arresting motion, an electro-magnet crescent shaped in a line or plane practically at right angles to that of the path of the magnetic circuit through such magnet, a cooperating revolving portion of magnetic material, the gap in the crescent being well defined and substantially as specified.

11. In a brake for revolving machinery, a revolving part, an axle attached thereto, a crescent-shaped brake magnet, the gap in the crescent being wider than the axle, and means whereby the magnet may be attached to and removed from the revolving part by slipping laterally with reference to the axle, the axle passing through the gap.

12. In brake for arresting motion, a crescent-shaped brake magnet, a part presenting a cooperating face, in combination with a lubricator in the gap of the crescent for a lubrication of such face.

13. In a brake for arresting motion, a crescent-shaped brake magnet, a part presenting a cooperating face, in combination with a lubricator in the gap of the crescent for a lubrication of such face, and means for feeding a lubricant.

14. In a brake for arresting motion, a lubricator for the brake consisting in a part provided with a cavity, a dry lubricant within the cavity, and means for feeding the lubricant.

15. In brake for arresting motion, a crescent-shaped magnet a groove sunk in one of its faces, the groove leading into the gap of the crescent from both ends of the magnet, a removable piece for such gap, and a magnetizing coil in the groove.

16. In a brake for arresting motion, a crescent-shaped magnet, a groove sunk within one of its faces, a "core" filling a portion only of the groove, and a magnetizing coil surrounding the core.

17. In a brake for arresting motion, a crescent-shaped magnet, a groove sunk within one of its faces, a core dividing the groove into two recesses, and an energizing coil, portions of which are in each recess.

18. In a brake for arresting motion, a crescent-shaped magnet, a groove sunk in one of the faces of the magnet, an energizing coil in said groove, a moving part presenting a cooperating face, the gap in the crescent being practically at a right angle to the line of the motion of the moving part, and substantially for the purpose specified.

19. In a brake for arresting motion, a crescent-shaped magnet, a groove sunk within one of its faces, a core dividing the groove into two recesses, the said core being larger toward its outer face whereby the recesses are contracted at this point, and an energizing coil, portions of which are within each recess.

20. In a brake for cars, a car axle, a revolving part mounted thereon, a brake magnet cooperating therewith, a groove within the brake magnet, a magnetizing coil in the groove smaller than the groove, and an insulating sulphur-like filling poured into the groove while in a liquid state, said filling being of such material as to become hard and form ample support and insulation for the coil, substantially for the purpose specified.

21. In a brake for cars, a car axle, a revolving part mounted thereon, a brake magnet cooperating therewith, a groove within the brake magnet, a magnetizing coil in the groove smaller than the groove, and a filling consisting of sulphur or sulphur-like material poured into the groove while in a liquid state, said filling becoming hard and forming ample support and insulation for the coil, substantially for the purpose specified.

22. In a brake magnet, a groove, a coil within the groove smaller than the groove, a filling for the body of the groove, and a separate filling for the mouth of same consisting of denser material.

23. In a brake magnet, a coil, two terminals therefor, one connected to the body of the brake magnet and the other free, the former being brought to the surface and re-embedded in the body of the magnet substantially for the purpose specified.

24. In a brake magnet, a coil, two terminals therefor, one connected to the body of the brake magnet and the other free, the former being brought to the surface, held by a clamp, and re-embedded in the body of the magnet substantially for the purpose specified.

25. In a brake, a coil, two terminals therefor, brought out to the surface and there held by a clamp to the body of the magnet, in combination with a length of free wire either side of the said clamp, substantially for the purpose specified.

26. In a brake magnet, a coil, two terminals therefor, an insulating bushing through which they are brought to the surface, a clamp for the terminals, and a length of free wire between the terminal and the clamp.

27. In a brake magnet, a coil, two terminals therefor, one connected to the body of the brake magnet and the other free, the former being brought to the surface and re-embedded in the body of the magnet, a screw for holding said embedded wire, and a counterbore for the outer end of said screw.

ELMER A. SPERRY.

Witnesses:
L. R. ABELL,
M. NIELSON.